(12) United States Patent
Choi

(10) Patent No.: US 10,009,351 B2
(45) Date of Patent: Jun. 26, 2018

(54) SYSTEM AND METHOD FOR ACCESS AND MANAGEMENT OF PHYSICAL OBJECTS OVER A COMMUNICATION NETWORK RELATED THERETO

(71) Applicant: Yu Yung Choi, Brooklyn, NY (US)

(72) Inventor: Yu Yung Choi, Brooklyn, NY (US)

( * ) Notice: Subject to any disclaimer, the term of this patent is extended or adjusted under 35 U.S.C. 154(b) by 129 days.

(21) Appl. No.: 15/161,244

(22) Filed: May 22, 2016

(65) Prior Publication Data

US 2016/0344740 A1 Nov. 24, 2016

Related U.S. Application Data

(60) Provisional application No. 62/165,786, filed on May 22, 2015.

(51) Int. Cl.
*G06F 21/00* (2013.01)
*H04L 29/06* (2006.01)

(52) U.S. Cl.
CPC .......... *H04L 63/102* (2013.01); *H04L 63/107* (2013.01)

(58) Field of Classification Search
CPC ..................... G06F 21/10; G06F 2221/2117
See application file for complete search history.

(56) References Cited

U.S. PATENT DOCUMENTS

| | | |
|---|---|---|
| 6,073,135 A | 6/2000 | Broder et al. |
| 6,119,229 A | 9/2000 | Martinez et al. |
| 6,249,227 B1 | 1/2001 | Brady et al. |
| 6,341,353 B1 | 1/2002 | Herman et al. |
| 6,591,252 B1 | 7/2003 | Young et al. |
| 6,886,748 B1 | 5/2005 | Moore |
| 7,042,335 B2 | 5/2006 | Franks |
| 7,072,892 B2 | 7/2006 | Hertz et al. |
| 7,172,117 B2 | 2/2007 | Moore |
| 7,230,534 B2 | 6/2007 | Elledge |
| 7,378,941 B2 | 5/2008 | Ashizawa |
| 7,471,199 B2 | 12/2008 | Zimmerman et al. |
| 7,593,864 B2 | 9/2009 | Shuster |
| 7,720,961 B2 | 5/2010 | Ievi et al. |
| 7,778,986 B2 | 8/2010 | Bish et al. |
| 7,787,987 B2 | 8/2010 | Kuehnrich et al. |
| 7,899,895 B2 | 3/2011 | Bish et al. |
| 7,930,316 B2 | 4/2011 | Muller et al. |
| 8,370,518 B2 | 2/2013 | Chen et al. |
| 8,547,575 B2 | 10/2013 | Mohammad et al. |
| 9,253,182 B1 | 2/2016 | Veen |
| 2001/0037248 A1 | 11/2001 | Klein |
| 2002/0032626 A1 | 3/2002 | DeWolf et al. |
| 2004/0034688 A1 | 2/2004 | Dunn |
| 2005/0114270 A1 | 5/2005 | Hind et al. |

(Continued)

*Primary Examiner* — Izunna Okeke

(57) ABSTRACT

The system and method of the present invention to provide at least one cloud-based things access and management system (things-system) for things lifecycle management, for a plurality of things' owners (manufacturer, store, end-user, etc.) having a thing's owner account (owner-account) with a things webpage associate to a thing's unique identification code (UID) which is stored in the owner-account for predetermined purpose, including thing's ownership rights to transfer, access, verify, transmit, control, interact, broadcast, etc. relating to the things-system applications, such as things to things (machine to machine), data exchange, including Internet of Things application.

19 Claims, 6 Drawing Sheets

(56) References Cited

U.S. PATENT DOCUMENTS

| | | |
|---|---|---|
| 2007/0239569 A1 | 10/2007 | Lucas et al. |
| 2010/0275270 A1 | 10/2010 | Wang et al. |
| 2012/0022974 A1 | 1/2012 | Shuster |
| 2012/0265694 A1 | 10/2012 | Tuchman et al. |
| 2013/0041997 A1 | 2/2013 | Li et al. |
| 2013/0299569 A1* | 11/2013 | Gentile .................. G06Q 10/08 235/375 |
| 2014/0129307 A1 | 5/2014 | Walker et al. |
| 2014/0239074 A1 | 8/2014 | Wang |
| 2014/0279597 A1 | 9/2014 | Kister |

* cited by examiner

SYSTEM AND METHOD FOR ACCESS AND MANAGEMENT OF PHYSICAL OBJECTS OVER A COMMUNICATION NETWORK RELATED THERETO

CROSS-REFERENCE TO RELATED APPLICATIONS

The present application is based on, and claim benefit and priority of, U.S. Provisional Patent Application Ser. No. 62/165,786 filed on May 22, 2015, the contents of which are incorporated herein in their entirety for all purposes.

FIELD OF THE INVENTION

The present invention relates to a system and method for processing unique identification code (UID) of things with a cloud-based (such as cloud computing) access, control and management system comprising plurality of things' owner account with an internet account and/or account platform. The owner uses the account platform to access and process information, such as Internet of Things (IoT) application.

BACKGROUND OF THE INVENTION

This invention is for improving and offering new use of applicant's U.S. Pat. No. 8,650,097 and application published No. 2013/0227653 A1 of system.

The solutions have been proposed that a cloud-based registration center system for products (or things) with a unique identification code (UID) assigned to each product and provide at least one registration center operable to store and enable conditional access to, at least one data record (e.g., at least one of: the ownership rights to the product, product information, manufacturer contact) linked to each product through its UID, such that at least one information record can be advantageously accessed and/or managed by at least one authorized inquirer through use of the UID. The UID registration center has a plurality of user accounts for storing the product's UID in the database system, that comprises a plurality of data records each linked to a particular UID stored in a corresponding UID registration center database file, such that at least one authorized inquirer is able to utilize a particular UID to access, verify, edit, transfer, transmit, and otherwise manage at least one information item related to each registered product in its corresponding UID registration center database file. This enables a user selling a particular product to a buyer, to transfer the UID registration center database file, corresponding to the UID of the product being sold, to the buyer, such as from first authorized party to transfer the product data file to second authorized party's account, when the first authorized party sells the product, to the second authorized party, for transferring the product's ownership rights.

The above noted that the UID is linked to the ownership rights record and the records in a data file and then transfers the UID and data file with the ownership transfer. However, these solutions can improve and be modified etc. in present invention.

SUMMARY OF THE INVENTION

The system and method of the present invention offer better and new use of the previously known relevant solutions by advantageously providing, at least one cloud-based things access and management system (things-system) for things lifecycle management comprising plurality of thing's owner accounts (owner-account(s)), each owner-account containing a plurality of webpages, with at least one webpage associated with a unique identification code (UID), and each UID belonging to a thing (e.g., product, object, having life). This UID can include everything—the living and the nonliving have a UID, such as index, serial number, IP address (IPv4, IPv6, etc.), which is embedded, integrated, stored or recorded in the things or may be a RFID or QR code etc. It is previously assigned for a thing and/or thing with its own features (e.g., object pattern, physical characteristics, morphological feature, deoxyribonucleic acid (DNA) code), where the UID of each thing is registered and stored in one or more particular owner account in a cloud-based things-system over at least one communication network (wired, wireless, remote access, etc.) and associated with one or more data identification code (DID) stored in an owner-account of corresponding database at the particular location, the DID being inclusive and/or linking of information related to the particular information, such as things' name, things' data, username, email address, etc., and wherein one or more authorized parties can subsequently advantageously utilize at least one UID (and optionally with verifier, security, etc.) to access a specific thing's webpage for predetermined purpose, such as to control, interact, broadcast, and/or otherwise manage at least one information item related to one or more corresponding registered things from their owner-account platform (e.g., webpage, interface, node) of the things-system, and each user account (owner-account, manufacturer, owner, end-user, etc.) can have its own account identification code (AID).

In addition, the inventive system and method advantageously provide an optimized process for verifiable transfer of ownership rights between a thing's authorized owner and intended recipient, the transfer process being implemented over at least one communication network with graphical user interfaces (e.g., owner-account platform) provided for each party, where the transfer of ownership rights involves association of the UID and/or things' name of things' webpage and the things' webpage control rights. The authorized parties can, from first authorized party account transfer the UID and/or things' name of things' webpage and things' webpage control rights, to a second authorized party account, by first authorized party input second authorized party of owner ID (OID) (e.g., username, email address, account number) in to an ownership text input field, to submit and/or confirm the things' webpage transfer. The things' system will automatically transfer the things' webpage control rights. The things webpage can also contains the things control rights (such as remote controlling the things).

In one of exemplary embodiments, provide a processing device (smartphone, lap-top, etc.) to scan, read, etc. UID and access to the UID linked and/or associated data for predetermined purpose (access to owner-account, control the things, etc.). The processing device can have its own operating system and/or application for predetermined purpose, such as using the processing device to scan a QR code then linking to the product data which is stored in the product's owner-account of things' webpage, and interact with things owner-account. The processing device contains the following feature or function of: machine readable, scan, sensor, smartphone.

In another of exemplary embodiments, the owner-account (manufacturer, store, end-user, etc.) can broadcast information to associate with UID's account and/or device for predetermined purpose. Each owner-account includes an interactive platform that enables the owner to broadcast, such as product information and interact with those who read or scan the UID. The owner-account can broadcast information to numerous UIDs at the same time. This can include but are not limited to: broadcast, education, recommendations.

In another of exemplary embodiments, the things-system, owner-account, things webpage and/or processing device, including thing's UIDs, data's DIDs, and things that are networked and/or connected and/or communicate with each other can intelligently process all of the data, including but not limited to the following features, functions and/or results: store thing's UID in owner-account, registration, verification, management, access, control, etc.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures.

DETAILED DESCRIPTION OF PREFERRED EMBODIMENTS

Figure 1:
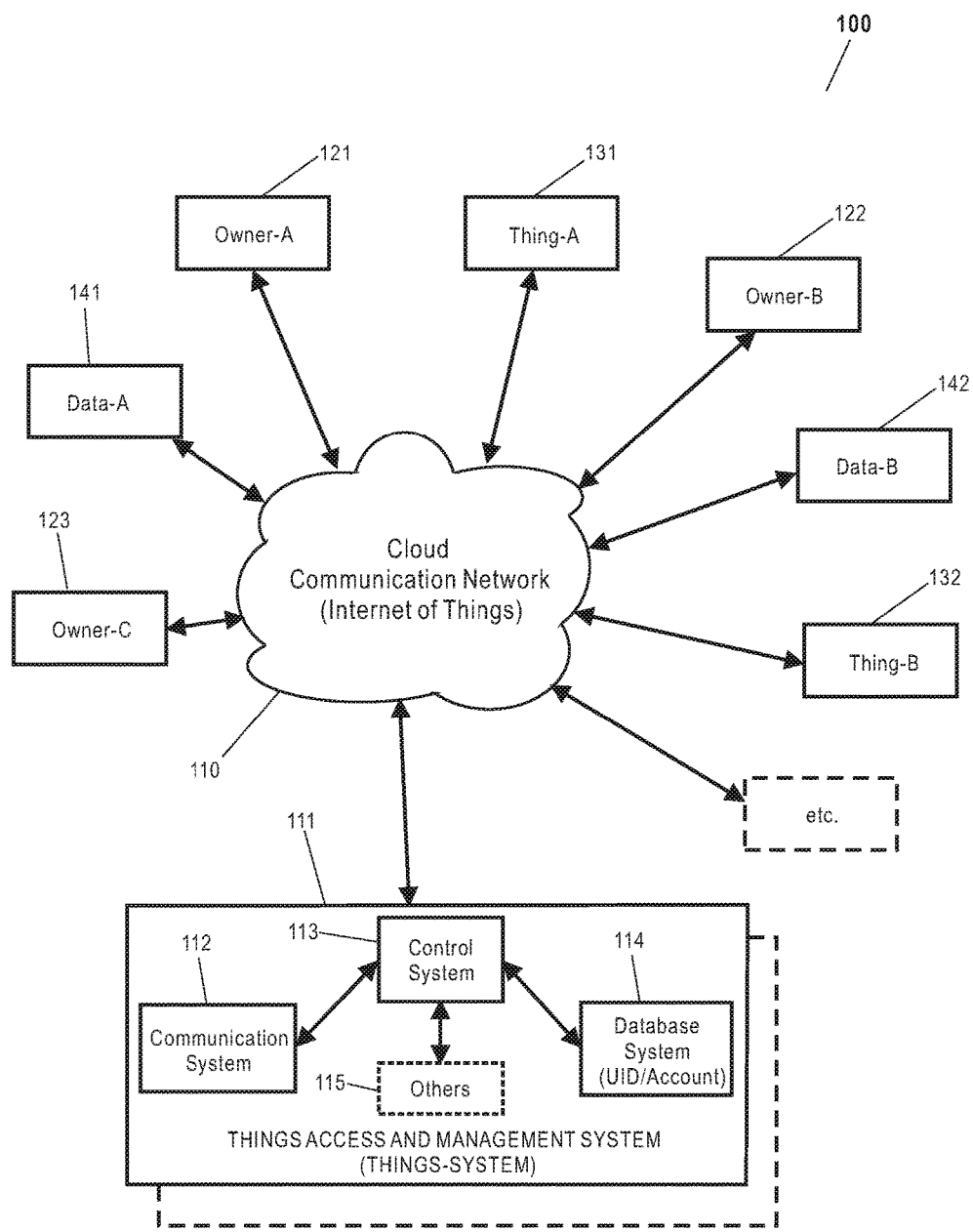
FIG. 1 is a block diagram of an exemplary embodiment of a cloud-based things access and management system (things-system) communicating with things, owners, data, etc.

The system and method for things lifecycle management of the present invention remedy the disadvantages of all previously known techniques, systems and methodologies relating to registration, verification, access, control, and management of information related to various things.

In essence, in various embodiments thereof, the inventive system and method advantageously provide at least one cloud-based things access and management system (things-system) containing a plurality of thing's owner accounts (owner-account(s)), with each owner-account containing a plurality of webpages, at least one webpage associated to a unique identification code (UID), and each UID belonging to a thing (e.g. product, object, having life, vehicle, boat, ship, aircraft, home appliance). This UID can include everything—the living and the nonliving have a UID, such as index, serial number, IP address (IPv4, IPv6, etc.), uniform resource identifier (URI), uniform resource locator (URL), GPS location, electronic product code (EPC), animal identification, biometrics identification, etc. which is embedded, integrated, stored or recorded in the things or as RFID, QR code, barcode, pattern and symbol etc. It is previously assigned for a thing and/or thing with its own features (e.g., object pattern, physical characteristics, morphological feature, deoxyribonucleic acid (DNA) code), where the UID of each thing is registered and stored in one or more particular owner-account in a cloud-based things-system over at least one communication network (wired, wireless, remote access, etc.) and associated with one or more data identification code (DID) stored in an owner-account of corresponding database at the particular location, the DID being inclusive and/or linking of information related to the particular information, such as things' name, things' data, username, email address and wherein one or more authorized parties can subsequently advantageously utilize at least one UID (and optionally with verifier, security, etc.) to access a specific thing's webpage for predetermined purpose, such as control, interact, broadcast, verify, edit, transfer, transmit, and/or otherwise manage at least one information item related to one or more corresponding registered things from their account platform (e.g., webpage, interface, node) of the things-system, and each user account (manufacturer, owner, end-user, etc.) can have its own account identification code (AID).

The UID can be printed, integrated and/or embedded to a specific location such as label, tag, card, surface, interior, life body, mainboard, module, processor board, control board, communication board, display board, I/O board, IC board, sensor board, flexible printed circuit board (FPCB), printed circuit board (PCB), RFID, inlay, processor, chip, IC, and sensor, to provide and/or broadcast and/or transmit information according with the UID for predetermined purpose.

Advantageously, in accordance with various embodiments of the inventive system and method providing an optimized process for verifiable transfer of ownership rights between a things' authorized owner and intended recipient, the transfer process being implemented over at least one communication network with graphical user interfaces (e.g., owner-account platform, webpage, interface, node) provided for each party, where the transfer of ownership rights involves association of the UID and/or things' name of things' webpage (thing-webpage) and the thing-webpage control rights. The authorized parties can, from first authorized party account transfer the UID and/or things' name of thing-webpage and thing-webpage control rights, to a second authorized party account, with first authorized party inputting second authorized party's owner data (e.g., username, email address, account number) into an ownership text input field, and submitting and/or confirming the thing-webpage transfer. That means whichever account holds the thing-webpage is on and/or active, the account's owner has ownership rights for the UID associated of the thing. Users can easily and/or simply use owner-account platform of thing-webpage, and input recipient's owner data (e.g., username), and the things-system will automatically transfer the thing-webpage and thing-webpage control rights. This is different to prior art's transfer of file and/or record because the webpage can contain and/or link with the file and/or record. The UID and/or thing-webpage control rights can transfer from an originator to the end user, passing however many owners, and the thing-webpage control rights of UID is present to correspond to the thing's UID of the thing's ownership rights, which will achieve thing's lifecycle traceability and/or management. The thing-webpage can also contain the thing control rights (such as remote control of the thing). For example, a machine-M is running and under remote control and/or monitored by owner-A account of webpage-M. Once owner-A transfers webpage-M to owner-B, owner-B has control rights to machine-M, and is able to use webpage-M in owner-B account. This is for example only, as the thing-webpage can contain and/or link various features and/or functions including but not limited to: access, verify, transfer, transmit, set-up control command, control product operation, monitor product data, post, trace data, collect data, distribute content, activate. This means all the settings and rights in the thing-webpage will transfer. The new owner just needs to continue following the old settings to run (such as the owner does not need to switch any settings). The things-system can be intelligent in comparing, matching and setting the thing to connect and/or communicate with other things.

Advantageously, in accordance with various embodiments of the inventive system and method, providing a processing device (smartphone, lap-top, portable device, etc.) to scan, read, etc. UID and access to the UID linked and/or associated data for predetermined purpose (access to owner-account, control thing, etc.). The processing device can have its own operating system and/or application for predetermined purpose, such as using the processing device to scan a QR code, and then link to the product data which is stored in the product's owner-account of thing-webpage, and interact with owner-account. The processing device contains at least one feature or function of: machine readable, scan, sensor, smartphone, wearable, portable device, barcode, QR code, symbol, pattern, lens, display, battery, GPS, GPS location, solar power, bioelectricity, machine vision, NFC, Bluetooth, Wi-Fi, RuBee, magnetic contact data transfer, EDGE, WiGig, Thread, ZiBee, DASH7, Z-Ware, 6LoWPAN, OSIAN, OSIAN, MyriaNed, Wavenis, light communication, vibration, sonar, laser, infrared and artificial intelligence.

Advantageously, in accordance with various embodiments of the inventive system and method, the owner-account (manufacturer, store, end-user, etc.) can broadcast information to associate with UID's account and/or device for predetermined purpose. Each owner-account includes an interactive platform that enables the owner to broadcast, such as product information and interact with those who read or scan the UID. The owner-account can broadcast information to numerous UID at the same time, which can include but is not limited to: broadcast, education, recommendation, sharing, provide service, provide information, and provide multimedia.

Advantageously, in accordance with various embodiments of the inventive system and method, the things-system, owner-account, thing-webpage and/or processing device, including thing's UIDs, data's DIDs, and things are networked and/or connected and/or communicate with each other, can intelligently process all of the data, including but not limited to the following features, functions and/or results: store thing's UID in owner-account, registration, verification, management, access, verify, transfer, transmit, set-up control command, control product operation, monitor product data, track product, set-up their own application, provide service, provide information, provide multimedia, guard against theft and loss, Internet website with a graphical user interface, open for public access to predetermined information, post, trace data, collect data, distribute content, activation, name/contact information of distributor, name/contact information of vendor, purchase date, return date, service/warranty claims, lost, stolen, returned to manufacturer, machine to machine, Internet of Things, information item being optionally time-stamped, enable the consumer selling a particular electronic product to a buyer, recovered electronic product, locate the owner of a recovered stolen product, enable a person who finds a lost product to contact its owner and return it, shipping, storage, inventory, e-commerce, after-market sales, account to account self-transfer ownership, machine readable, scan, sensor, smartphone, wearable, barcode, QR code, symbol, pattern, lens, display, battery, GPS, GPS location, solar power, bioelectricity, machine vision, NFC, Bluetooth, Wi-Fi, RuBee, magnetic contact data transfer, EDGE, WiGig, Thread, ZiBee, DASH7, Z-Ware, 6LoWPAN, OSIAN, OSIAN, MyriaNed, Wavenis, light communication, vibration, sonar, laser, infrared, index, IP address, object pattern, physical characteristics, morphological feature, deoxyribonucleic acid (DNA) code, big data, data processing, data analysis, passive/semi-passive/active manner, activated/deactivated feature, conjunction with a verifier, insurance, financing, mortgage, recycling, drugs management, drugs trace, guns management, guns trace, food management, food trace, interaction, multimedia, advertising, recommendation, sharing, broadcast, education, maintenance, security, monitoring, biometric identity verification, purchasing management, production management, supply chain management, warehouse management, commodity management, housekeeping, statistics, prediction market, accounting, tax administration, anti-counterfeit goods, human management, human trace, animal management, animal trace, artificial intelligence and robot.

Advantageously, in accordance with various embodiments of the inventive system and method, after registration of UIDs in conjunction with the creation and configuration of corresponding things-system, and population thereof with at least one data item, one or more authorized parties (such as the things' owner, consumer, end-user, manufacturer, store), can subsequently advantageously utilize the UID and optionally a verifier previously assigned thereto during registration or otherwise lawfully provided thereto (e.g., from the manufacturer, or from the product's seller during purchase thereof), to interact, broadcast, access, verify, edit, control, transfer, transmit, and/or to otherwise manage at least one data item in the things-system's account platform (e.g. webpage, interface, node), that corresponds to the UID (and optionally that also corresponds to the predetermined verifier) which can be instead by a thing's name (already associated with the UID) for the owner (consumer, user, etc.) to easily recognize.

Advantageously, in accordance with the present invention, in a preferred embodiment thereof, if the UID of a thing-webpage in the owner-account is active, the thing-webpage in the owner-account platform (e.g., interface, node) can contain an ownership data input field (e.g., a fillable field) also active (e.g., fillable) for the owner to choose whether to transfer ownership rights or not, meaning the account owner has the thing-webpage control rights and the ownership rights to the thing at this moment, enabled to input next owner's or recipient's name (e.g., username, email address) into the ownership data input field. Therefore, the UID is in the owner-account and is active, which means the UID is linked or associated to a data by its own data identification code (DID) and is also active. The DID can contain username, email address, etc. as an owner and/or owner-account of unique identity. The thing-webpage and ownership data input field is convenient for the thing's owner to transfer the thing-webpage and respective rights. The thing-webpage can comprise of other functions such as publishing or commenting options.

Referring now to FIG. 1, an exemplary embodiment of infrastructure 100 of the cloud-based things, data, account, etc. connected with each other over a cloud-based communication network (e.g., Internet of Things) 110. The things-system 111 is one of a plurality of things-system, for at least to access, control, verify, manage, interact, broadcast, etc. with things, owner-account(s) (or account platform, web-page, node, etc.) and data. Each thing, owner-account, data, etc. have a UID (data's UID can be called DID). They can be linked or associated with each other by those UID or DID for predetermined purpose. In at least one of things-system 111, a communication system 112 can be included for data exchange, etc., control system 113 for server, application, processor, etc. and database system 114 for storing datum, UIDs, owner-account(s), etc. information. The communication system 112, control system 113 and database system 114 are for example only in the things-system 111, and are not limited to contain other 115 appropriate system, such as security system, artificial intelligence system, backup system, software and application.

Each owner-A 121, owner-B 122 has own account for storing own things' data, including things' UIDs. The owner-account holding the UID corresponds to their ownership of that product's UID. Thus, the product owner can login from a device (e.g., UID process device, smartphone, wearable, watch, glass, computer, TV, car, boat, thing) to their account for predetermined purpose, such as control, interact, broadcast, post, trace data, collect data, distribute content, activation, registration, verification, management, access, verify, transfer, transmit, set-up control command, control product operation, monitor product data, track product, set-up their own application, provide service, provide information, provide multimedia.

For example, for a plurality of things, owner-account(s) and data in the things-system 111, each thing-A 131 and thing-B 132 has a UID which can be stored in one or more of owner-A 121's, owner-B 122's, owner-C 123's account in the database system 114 of the things-system 111. Such UID can link with at least one or more of data-A 141, data-B 142 of DID. The data-A 141 and data-B 142 can be stored in database system 114 or a predetermined location other than things-system 111.

The UID can be included with the living (e.g., human, animal) and the nonliving things which have the UID or DID, such as index, serial number, IP address (IPv4, IPv6, etc.), uniform resource locator (URL), uniform resource identifier (URI), GPS location, electronic product code (EPC), animal identification, biometrics identification, object pattern, physical characteristics, morphological feature, deoxyribonucleic acid (DNA) code, also including data, message, content, owner-account number, username, email address, telephone number, things' name. They can link or associate with each other by the UIDs, and can communicate with each other including the thing's UID. The UID can automatically be assigned by the things-system 111.

Each account owner-A 121, owner-B 122 and owner-C 123 of things enable transferring of their own things and the things webpage control rights between each owner-account over the things-system 111.

Figure 2:
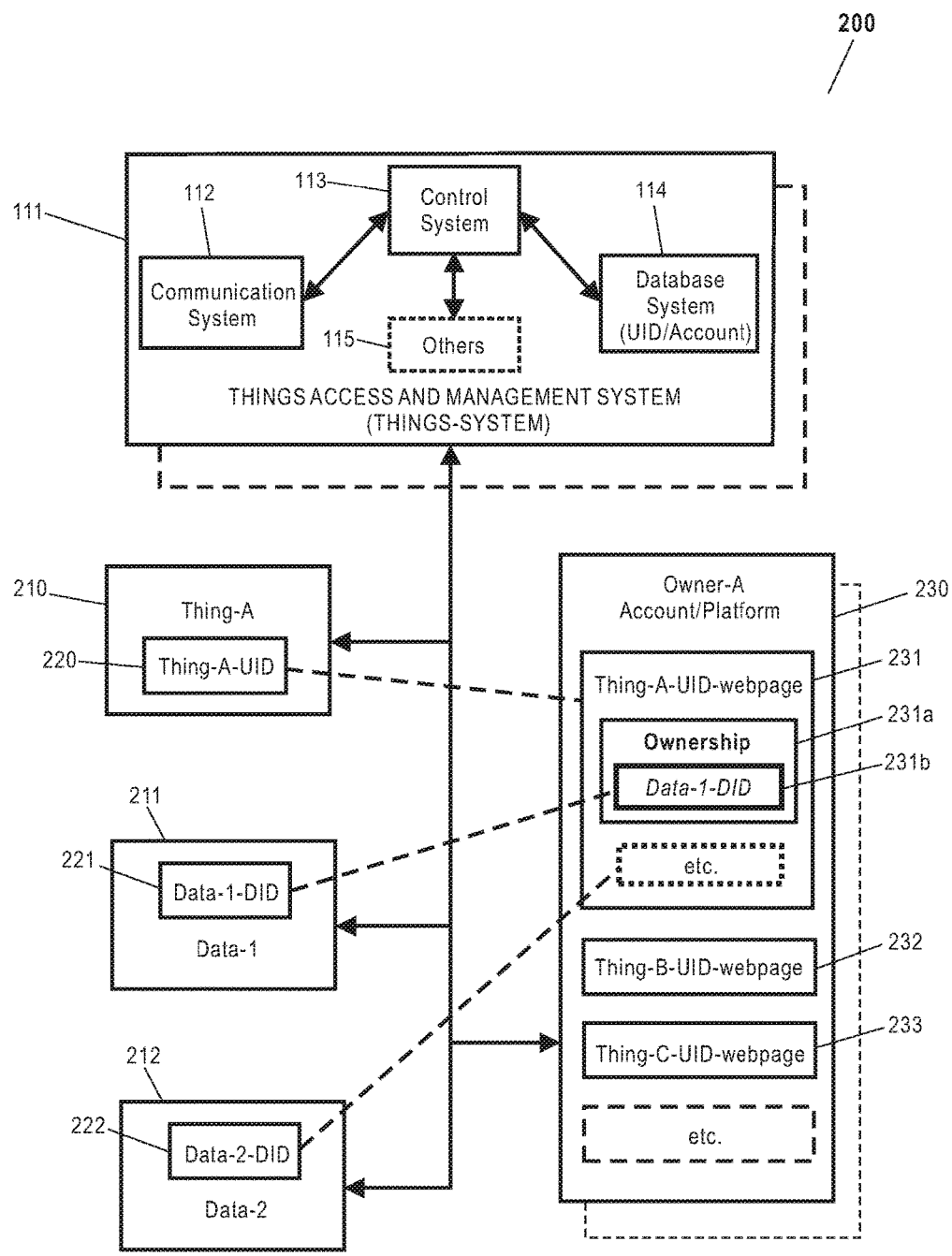
FIG. 2 is a block diagram of an exemplary embodiment of things-system, owner-account, things and data relationship, including a things webpage with ownership data field.

Referring now to FIG. 2, an exemplary embodiment of an implementation process 200, showing at least one things-system 111 containing at least an owner-A account/platform 230, as one of plurality of owner-accounts. At least one of thing-A 210 has a thing-A-UID 220 that is associated and/or equal (meaning they are same) to a thing-A-UID-webpage 231 (e.g., node, interface) which is stored in an owner-A account/platform 230. The thing-A-UID-webpage 231 can be accessed from any suitable device (e.g., processing device, smartphone, thing) by reading/scanning the thing-A-UID 220, which means the thing-A-UID 220 is a thing-webpage identification (or URL, URI, etc.) for the thing-A-UID-webpage 231 in the owner-A account/platform 230. It is not changeable for a thing's lifecycle, but a thing can be transferred between a plurality of owner-accounts. At least one thing-A-UID-webpage 231 contains an ownership 231a data input field 231b for data-1-DID (e.g., username, email address), used for transferring the thing-webpage control rights.

The thing-A-UID-page 231 can be associated to each data DID, such as data-1 211 and data-2 212 of data-1-DID 221 and data-2-DID 222. Such data can be a product data, message, multimedia, picture, owner name, username, email address etc., stored in the owner-A account/platform 230 or other account in the things-system 111, or even outside of things-system 111 in a predetermined location.

For example the things-system 111 contains an owner-A (such as manufacturer) which produces a new thing-A 210 (such as a toy) with a thing-A-UID 220, and it is stored in the owner-A account/platform 230 of thing-A-UID-page 231. The thing-A-UID-page 231 contains an ownership 231a of field 231b for inputting data-1-UID (such as username, email address which may be unique in the things-system). The ownership 231a data input field is only active and can be accessed by whoever owns the UID. The UID can be transferred by having the first owner input the second owner's username, email address, etc. in the ownership 231a of field 231b and submit, and the things-system 111 will automatically transfer the same UID and/or thing-webpage from first owner-account to second owner-account. So, the thing-webpage can always be accessed and/or linked from the same UID when the owner-account owns the UID. Furthermore, for new things, the ownership field 231b can be empty (e.g., blank for anonymous) for a new owner to self-input their username to transfer the UIDs to their own account.

The owner-A account/platform 230 contains a plurality of thing-webpage(s), including thing-B-UID-webpage 232, thing-C-UID-webpage 233, etc. They are associated with their own data. Such data can automatically link to each other, such as matching, configuring, communicating with each thing.

The owner-account of owner-A account/platform 230 is for example only, as there can be more than one owner-account in the things-system 111. The owner-account can be a manufacturer, a store, a warehouse, an authorized party, an originator party, a product manufacturer, an end-user, an original equipment manufacturer (OEM), an original design manufacturer (ODM), an original brand manufacturer (OBM), a brand, an intermediary, a product distributor, a consumer, an e-commerce store, a store selling the product, a service provider, an owner of the product, an intended recipient of ownership rights to the product, law enforcement personnel, and a party finding a product that has been previously lost or stolen or any account of whoever owns the things.

Figure 3:
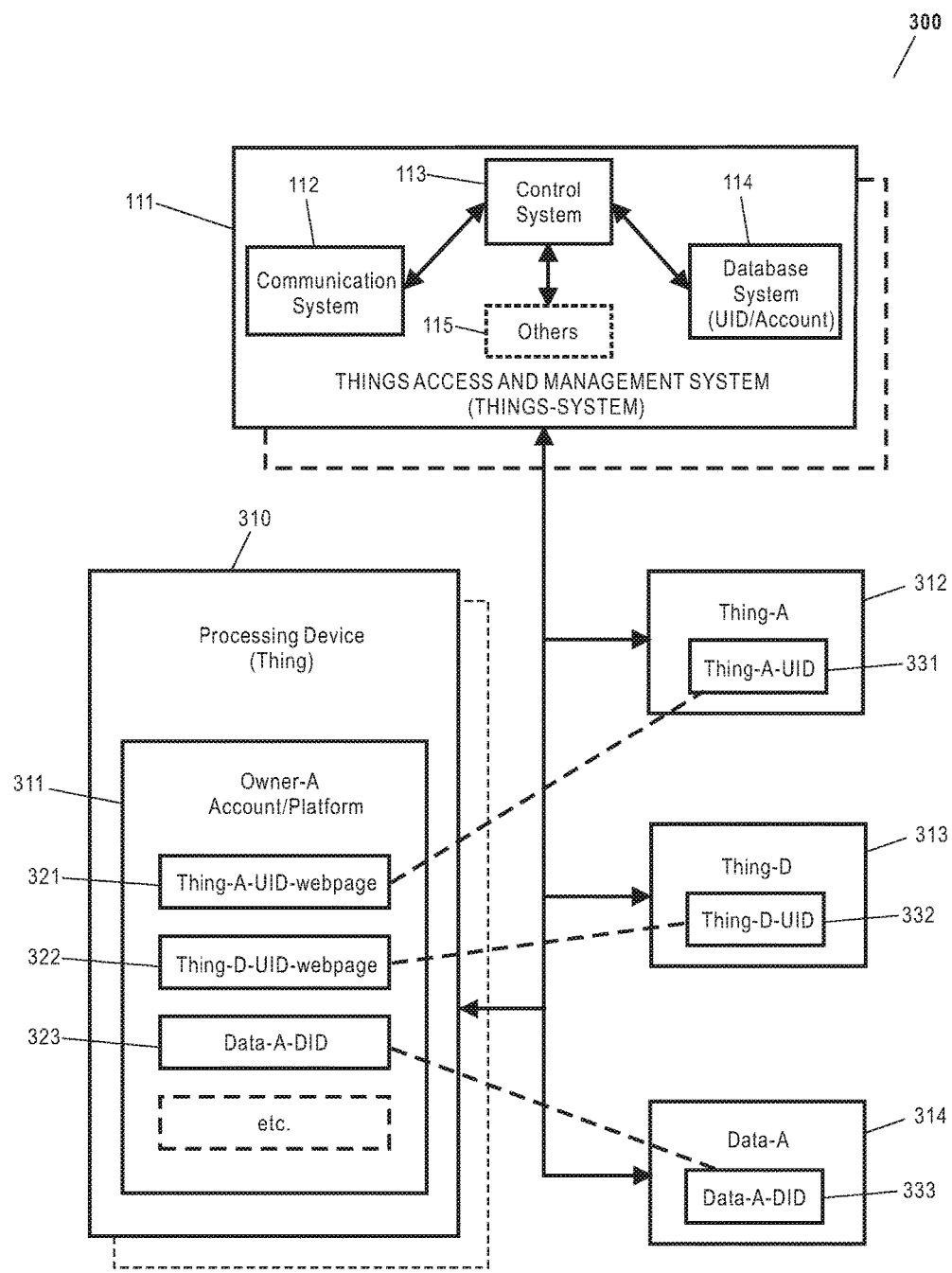
FIG. 3 is a block diagram of an exemplary embodiment of a processing device in contact with things-system and things.

Referring now to FIG. 3, an exemplary embodiment of an implementation process 300, showing a processing device 310 (e.g., smartphone, wearable, watch, glass, computer, TV, car, boat, thing) running an application access to things-system 111 of owner-A account/platform 311 over a communication network such as NFC, Bluetooth, Wi-Fi, RuBee, magnetic contact data transfer, EDGE, WiGig, Thread, ZiBee, DASH7, Z-Ware, 6LoWPAN, OSIAN, OSIAN, MyriaNed, Wavenis, light communication, vibration, sonar, laser, infrared. In the owner-A account/platform 311, one can display or show thing-A-UID-webpage 321, thing-D-UID-webpage 322 and Data-A-DID 323 as associated and/or equal (meaning they are same) to thing-A 312 of thing-A-UID 331, thing-D 313 of thing-D-UID 332 and data-A 314 of data-A-DID 333. So, the processing device 310 (or from owner-A account/platform 311) can access thing-A 312, thing-B 313 and Data-A 314 for a predetermined purpose, such as to manage, control, command, interact, etc., For example to set thing-A 312 with thing-D 313 on auto data exchange (machine to machine, etc.) to control, monitor, operate, etc., to view the data from data-A 314 etc., or such device, account platform, applications, etc. to implement through Internet of Things (IoT), monitoring, biometric identity verification, purchasing management, production management, supply chain management, warehouse management, commodity management.

The processing device 310 can have its own UID stored in owner-A's account in the things-system 111. The processing device 310, thing-A 312, thing-B 313 and Data-A 314 can select and/or automate communication with each other over a communication network (cloud computing).

The thing-A 312 and thing-D 313 can automatically match, configure and install when two (or more) things are in the same owner-account or associated account. For example the thing-A 312 is already in the owner-A account/platform 311. When thing-D 313 of thing-D-UID 332 is transferred into the owner-A account/platform 311, the things-system 111 will intellectively match, configure and install to connect thing-A 312 and thing-D 313 in the same account of owner-A account/platform 321 or associated account. When the end-user purchases a thing without inputting any data, the thing and the things-system will automatically match, configure and communicate with other existing things in the same account or associated account, once the UID is in the owner's account. Obviously, the thing can still be in the shipping box, and without opening the box the thing is already installed and/or active. The thing can only be controlled by its UID on a thing-webpage from the owner-account. This can prevent the thing from being lost or stolen. Thus the things-system includes artificial intelligence, robot, machine learning, big data, data processing, data analysis, etc.

For example, the end-user can use the processing device to read or scan the UID (from e.g., barcode, QR code, symbol, pattern, sensor, machine perception) of the thing in which the user is seeking to purchase. Then the things-system's owner-account (or appropriate application) will automatically compare and/or match the thing with the other things which are already in the end-user's account. The things-system's owner-account (or appropriate application) can intelligently provide some suggestions, recommendations and/or references for the end-user.

The UID may not display on the owner-account platform, but instead with a thing's name, picture, etc., for easy recognition, but they are substantially associated with the UID, with the things' name, etc. The owner (user, etc.) may not even sense the UID, because the things-system 111 automatically processes the UID resolution to translate UID to thing's name, model, etc. as human-friendly characters or symbols.

The owner (end-user, etc.) account and/or platform can be a unified platform for owner to control (process, set, monitor, etc.) everything linked and/or associated with the UID. The owner can be able to share the account (or part of account, or some things, etc.) with another account, for example a family or group account can share some things with family or group members.

The processing device can be any electronic device (it also is a thing in present invention) such as smartphone, wearable, watch, glass, computer, TV, car, boat, with wired and/or wireless communication and data processing capacity, including but not limited to machine readable, scanner, sensor, smartphone, wearable, barcode, QR code, symbol, pattern, lens, display, battery, GPS, GPS location, solar power, bioelectricity, machine vision, NFC, Bluetooth, Wi-Fi, RuBee, magnetic contact data transfer, EDGE, WiGig, Thread, ZiBee, DASH7, Z-Ware, 6LoWPAN, OSIAN, OSIAN, MyriaNed, Wavenis, light communication, vibration, sonar, laser, infrared, artificial intelligence, etc.

Figure 4:
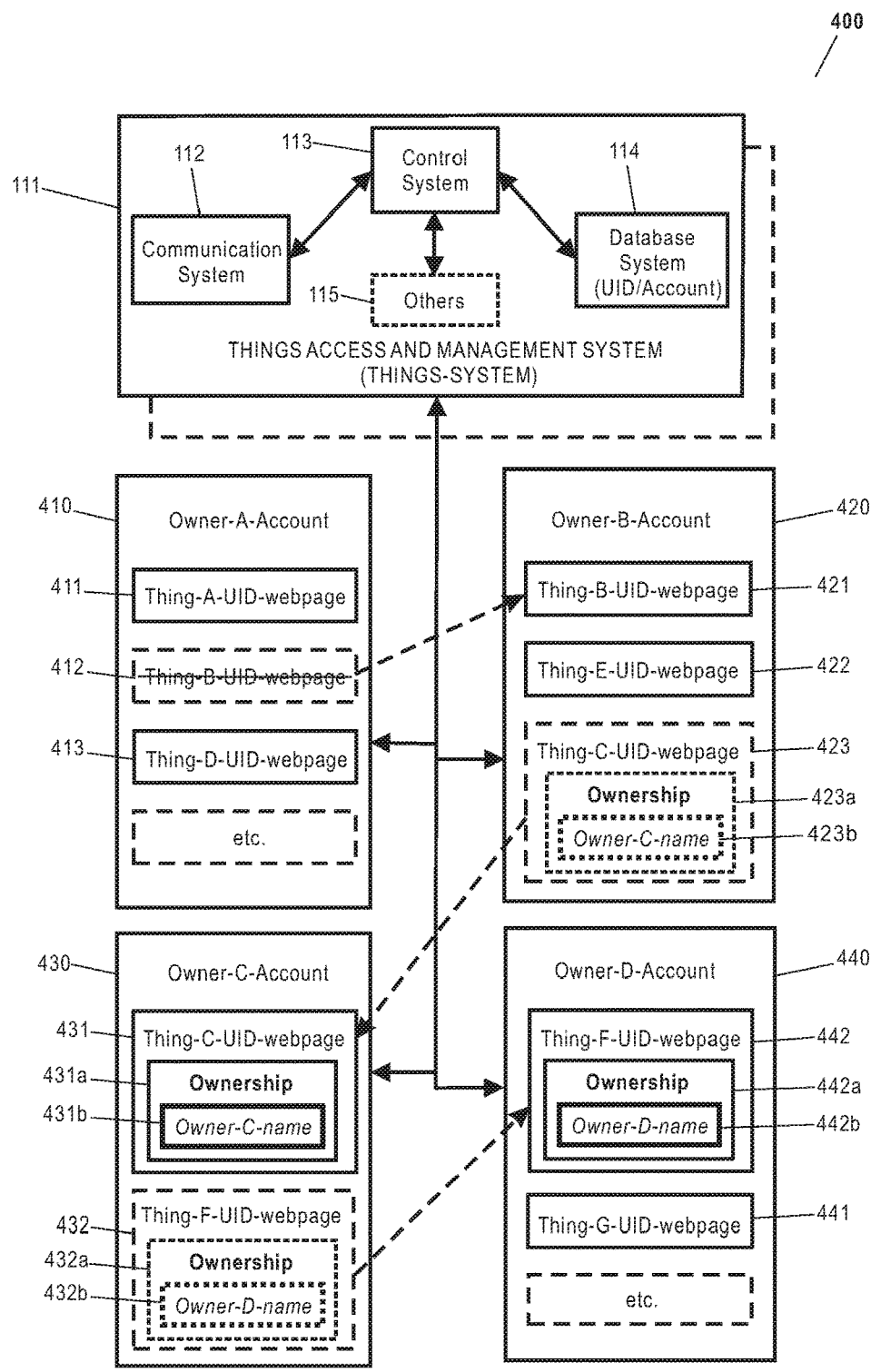
FIG. 4 is a block diagram of an exemplary embodiment of things-system including owner-account(s) and transferring things webpage between the accounts, utilizing ownership data field.

Referring now to FIG. 4, an exemplary embodiment of an implementation process 400, showing things-system 111 including plurality of owner-accounts, such as owner-A-account 410, owner-B-account 420, owner-C-account 430 and owner-D-account 440, with each account consisting of UIDs. The things owner can transfer the UID between each owner-account for the ownership rights to transfer for predetermined purpose.

From the owner-A-account 410 shows thing-A-UID-webpage 411, thing-B-UID-webpage 412 and thing-C-UID-webpage 413. But the thing-B-UID-webpage 412 with a strikethrough and a dashed box means thing-B-UID-webpage 412 is removed from the owner-A-account 410, since it has been transferred to the owner-B-account 420, which is now thing-B-UID-webpage 421. The thing-B-UID-webpage 412 and 421 is the same webpage and has the same UID before and after its transfer, the difference is that the thing belongs to a different owner-account.

And from the owner-B-account 420 showing thing-B-UID-webpage 421, thing-E-UID-webpage 422 and thing-C-UID-webpage 423, but the thing-C-UID-webpage 423 with a dashed box means it is inactive and/or vestigial in the owner-B-account 420. The thing-C-UID-webpage 423 contains an ownership 423*a* data field 423*b*, when the ownership field 423*b* is filled in with the owner-C-name in the owner-B-account 420 and submitted (e.g., transfer request), then things-system 111 is processed and transferred to the owner-C-account 430, which becomes thing-C-UID-webpage 431 now. The thing-webpage control rights of thing-C-UID-webpage (423 or 431) is transferred from owner-B-account 420 to owner-C-account 430. Now, the thing-C-UID-webpage 431, ownership 431*a* and field 431*b* in the owner-C-account 430 are shown in solid line box, meaning it is active and/or almighty and the owner-C-account 430 have thing-C-UID-webpage 431's control rights. By analogy the owner-C-account 430's owner has the ownership rights to the things-C (not shown).

Therefore, the owner-C-account 430 shows the thing-F-UID-webpage 432 with a dashed box meaning it is inactive and/or vestigial in the owner-C-account 430. When the ownership 432*a* field 432*b* has owner-D-name, it is transferred to the owner-D-account 440, which is now thing-F-UID-webpage 442. The owner-D-account 440 shows the thing-F-UID-webpage 442 and the ownership 442*a* and field 442*b* with a solid line box, meaning it is active and/or almighty in that account, meaning the owner-D-account 440 have the webpage control rights to thing-F-UID-webpage 442 and also have the ownership rights to the things-F (not shown). So, the owner-D-account 440 also contains a thing-G-UID-webpage 441, etc.

The owner-A-account 410 has ownership rights for thing-A-UID-webpage 411 and thing-D-UID-webpage 413 and its associated thing. The owner-B-account 420 has ownership rights for thing-B-UID-webpage 421 and thing-E-UID-webpage 422 and its associated thing. Because they have the thing, they have the thing-webpage control rights to the respective thing.

Process 400 shows the thing-B-UID-webpage 412 in the owner-A-account 410 as the same as thing-B-UID-webpage 421 in the owner-B-account, the thing-C-UID-webpage 423 in the owner-B-account 420 as the same as thing-C-UID-webpage 431 in the owner-C-account 430 and the thing-F-UID-webpage 432 in the owner-C-account 430 as the same as thing-F-UID-webpage 442 in the owner-D-account 440. This means the thing-webpage's UID is unchanged when it is transferred. So, the thing-webpage is example only, and transfer of thing-webpage is equivalent to transfer of UID, because the thing-webpage is dependent on the UID to make it unique. Using thing-webpage is more intuitive for users to operate. But in some cases, users do not need to open thing-webpage to transfer it, and can just transfer the UID only, such as at a point of sale (POS), mass transfer, business to business (B2B). The thing-webpage or UID can be accessed and/or linked from any suitable device (e.g., processing device, smartphone, wearable device) by reading/scanning the UID (e.g., QR code, RFID, pattern, symbol).

Furthermore, the thing-webpage can contain an ownership field (e.g., text input field, details showing FIG. 6) for the thing-webpage control rights transfer. When the ownership field is filled in with a name, then the thing-webpage will transfer to the name's owner-account, which means the thing-webpage control rights is transferred. Before thing-webpage transfer the ownership field it may have present owner's name or may be blank (as anonymous, such as for a new thing). The thing-webpage can contain other feature and/or function of rights (other rights), such as monitor rights, control rights, setting rights, when the thing-webpage is transferred, that other rights in the thing-webpage can also transferred. The new owner may not need to change any setting, for example transferring a thing-webpage to control a running machine, after transferring the new owner just continues with the old settings to run that machine, and does not have to make any changes. So, all the other rights in that thing-webpage are transferred when that thing-webpage is transferred. The thing-webpage contains corresponding thing data, rights, picture, video, etc. but it can also contain another thing(s) information.

A thing can have more than one thing-webpage but are linked with same UID. A thing has at least one thing-webpage including an ownership field for filling in an owner's name (e.g., username, email address, number, character, keyboard characters and non-keyboard characters), and this name may be unique. The ownership field can use keyboard and/or appropriate devices (e.g., UID process device, reader, scanner, smartphone) to manually or automatically fill in, such as in a point of sale (POS) system which can auto input a buyer's name by scanning the buyer's membership card. The things-system 111 can also provide mass processing of thing-webpage transfer, such as mass transferring from manufacturer to store thing-webpage(s) and/or UID at once.

The thing's name can be associated with a UID, then become a unique name, so transferring the things' ownership rights can be done by just transferring the UIDs and/or thing's name (meaning the thing's name is associated with UID, the thing-webpage only shows thing's name instead of the UID, but thing's name represents the UID for the purpose of allowing the owner to easily recognize (human-friendly, etc.)) between each owner-account(s) (can auto-transfer, etc.), because the UIDs are linked and/or associated with the DID, shown in FIG. 2. The DID can be a unique owner's username in the ownership field, and this ownership field only appears and/or is active in that thing's owner-account. The thing's owner can just input and/or change the owner's name (e.g., username, email address, phone number) in the ownership field to a recipient's name (e.g., username, email address, phone number), which automatically transfers the thing-webpage control rights, meaning whichever owner-account holds the thing-webpage (or the ownership field) is active and/or almighty. The account's owner has ownership rights for the UID associated with the thing. So, the owner (user, etc.) can just transfer the thing's name, the things-system and/or owner-account will automatically transfer the associated UID (thing-webpage, etc.), and that owner will not even sense that the UID has been transferred.

Therefore, the UID may not display on the owner-account platform. Instead, a thing's name, picture, etc., for easy recognition (human-friendly, etc.) may be displayed, but they are substantially associated. So, the thing's name in the things-system and/or owner-account may not be unique, but when it is associated with the UID, the thing's name has become unique.

The UID can transfer on a point of sale (POS) system, after a thing's payment (after a purchase, etc.) and then automatically transfer the UID from a store's account (seller account, etc.) to buyer's account, such as the buyer's credit card (smartphone, username, email address, etc.) that is linked with buyer's account for e-payment (mobile payment, etc.), in which the store's account will automatically connect and transfer the UID (e.g., thing-webpage, thing-webpage control rights) to the buyer's account. Such transaction can be from a store, online, person to person (P2P), manufacturer to person (M2P), etc.

All of the things data (specification, requirement, etc.) are stored in the things-system 111, the things-system 111 can intelligently process (e.g., big data, machine learning, data analysis) accounts such as manufacturer account, once the UID transfers to the end-user account. The things-system 111 can automatically connect each thing (device, module, etc.). The end-user can just put and/or transfer the UID to their account of predetermined location. The things-system 111 can automatically remote connect each of the things (device, etc.) together over the communication network. For example the end-user account can collect and classify the things (the things-system can auto-classify, etc.), each group of classification has a lead-things (junction node, etc.), and once end-user put the UID in to this group, it will automatically integrate with this group of things for predetermined purpose.

The thing can connect to originator (manufacturer, etc.) account and auto communicate with originator account and things-system 111, such as a thing manufactured which is already communicating with manufacturer account, etc. Once the thing transfers the UID to another (owner-account), the thing will automatically communicate with the owner-account which is holding the things, which means that the thing has become a member of the group of things in the owner-account.

The things-system 111 can have an account for take-over and/or proxies to other UIDs and/or owner-account(s) for predetermined purpose. This can include public things, public accounts, derelict things, unclaimed things, abandoned things, etc.

The UID is in the things-system 111 for life-time of associated thing, such as from beginning of originator to end of end-user. The UID uninterruptedly transfers between relevant accounts. So, the things-system 111 and/or account/ platform can be applied to inventory, supply chain, anti-counterfeiting, loss and found, lost tracking, etc., and also can provide thing's authentication (the third-party certification online, etc.), things warranties, things monitoring, etc. Each account can include SaaS applications, such as enterprise resource planning (ERP), insurance, financing, mortgage, recycle, drugs management, drugs trace, guns management, guns trace, foods management, foods trace, advertising, education, maintain, security, monitoring, biometric identity verification, purchasing management, production management, supply chain management, warehouse management, commodity management, housekeeping, statistics, prediction market, accounting, tax administration, anti-fake, human management, human trace, animal management, animal trace. The things-system can provide open API and/or platform for third parties.

Figure 5:
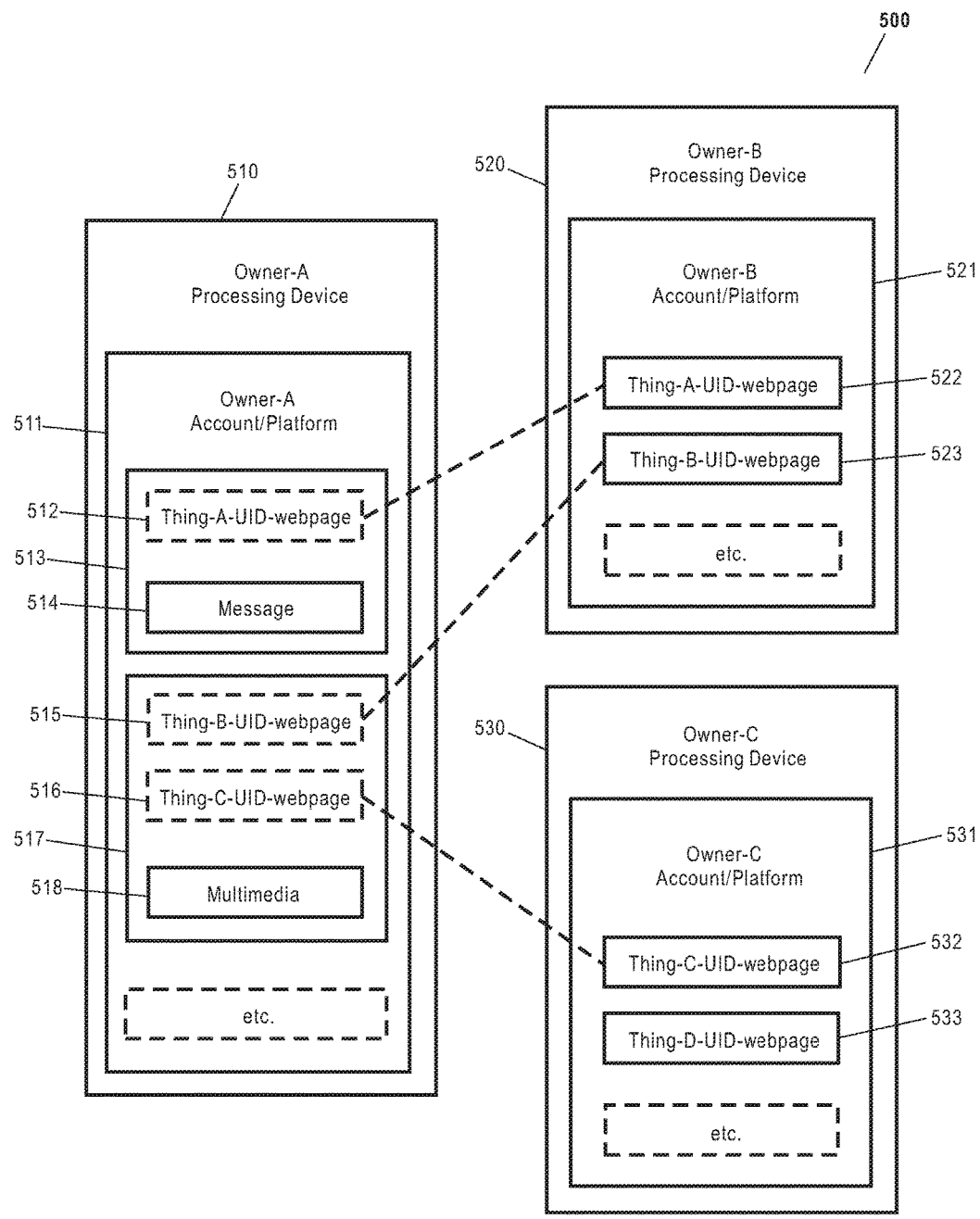
FIG. 5 is a block diagram of an exemplary embodiment of an owner-account providing information to other account with things UID.

Referring now to FIG. 5, an exemplary embodiment of an implementation process 500, showing owner-A processing device 510, owner-B processing device 520 and owner-C processing device 530 having access to things-system 111 of each account over a communication network. The thing-A-UID-webpage 512 in the owner-A account/platform 511 is transferred to owner-B account/platform 521 of thing-A-UID-webpage 522 for predetermined purpose. The thing-A-UID-webpage 512 is inactive and/or vestigial, but it is banding and/or associating 513 with a message 514 (or message ID, etc.), in which owner-A can put a message (picture, etc.), and it can be editable. Then owner-B UID's processing device 520 can access by getting thing-A-UID-webpage 522 to read the message 514 from owner-A account/platform 511.

For example, the owner-A sends a gift to owner-B. The gift comes with a barcode, QR code and/or RFID, etc. machine readable component which comprises of the thing's UID. When the owner-B receives the gift and uses a processing device to scan and/or read out the UID, owner-B is then automatically linked to the owner-A's account's messages, pictures, videos, etc. This message can be renewable, interactive, broadcasted etc. and can store in either owner-account or others. Such owner-account platform is an interactive platform for things owner to communicate and interact which is linked from the UID.

The owner-B UID process device 520 and owner-C UID process device 530 also can access owner-A account/platform 511 of multimedia 518 by thing-B-UID-webpage 523 and thing-C-UID-webpage 532, because they are associated with thing-B-UID-webpage 515 and thing-C-UID-webpage 516 as both are banding and/or associating with 517, which is more than one account/platform which can have access to same data (music, movie, etc.), and the data can change as many times as needed. Thus the things-system or account/platform can provide an interactive platform that enables the owner to broadcast information and interact with those who read or scan the UID. The owner-account can broadcast information to numerous UIDs at the same time. This can include but are not limited to: broadcast, education, recommend, shared, provide service, provide information, and provide multimedia.

For another example, a toy manufacturer account sells a toy to end-user, the end-user can use processing device (smartphone, computer, portable device, etc.) to scan/read the toy's UID and access or link to a video from the manufacturer's account, in which the manufacturer's account can broadcast some media (or user-manual, update download, etc.) to their product's end-user.

The owner-account (user account) can be a service provider to provide service to other accounts (users, etc.), such as product selling, education, recommendation, sharing, etc. Meanwhile, the processing device without using its own account/platform (e.g. login to account) also can limit access to any things' information by interaction by reading/scanning the UID.

The things-system can provide various kinds of application (APP) for the user account and/or user to use for predetermined purpose. The things-system can provide open interface for third party's service, APP, etc., such as application development platform. The things-system can provide service for user account and/or user, such as data analysis, data handling.

The owner-account (e.g., store, peddler) and thing (e.g., car, vending machine) can broadcast their UID (e.g., thing-webpage) for any device to receive and interact for predetermined purpose, such as vending machine broadcasting information (e.g., advertising, product list) for a buyer. Then the buyer can use own device to (e.g., smartphone, UID process device) interact (e.g., choose product, make a payment) with vending machine.

The things-system can embody the UID resolution to translate UID to thing's name, model, etc. like the domain name system (DNS), interconvert machine readable and human-friendly characters, such as things identifier system (TIS), etc. The things-system and/or account can include machine learning, intelligent analysis, artificial intelligence, etc., of feature and/or function.

The processing device has its own UID and can combine by scanning and/or reading out from other UID for predetermined purpose, such as security certificate. The processing device can include scan, read, QR code, RFID, NFC, GPS, mobile, sensor, artificial intelligence, etc., for feature and/or function.

The communication network, data communication, data, UID, DID and AID can have special treatment including but not limited to special processing, encryption, decryption, verification, etc. for security purposes.

Figure 6:
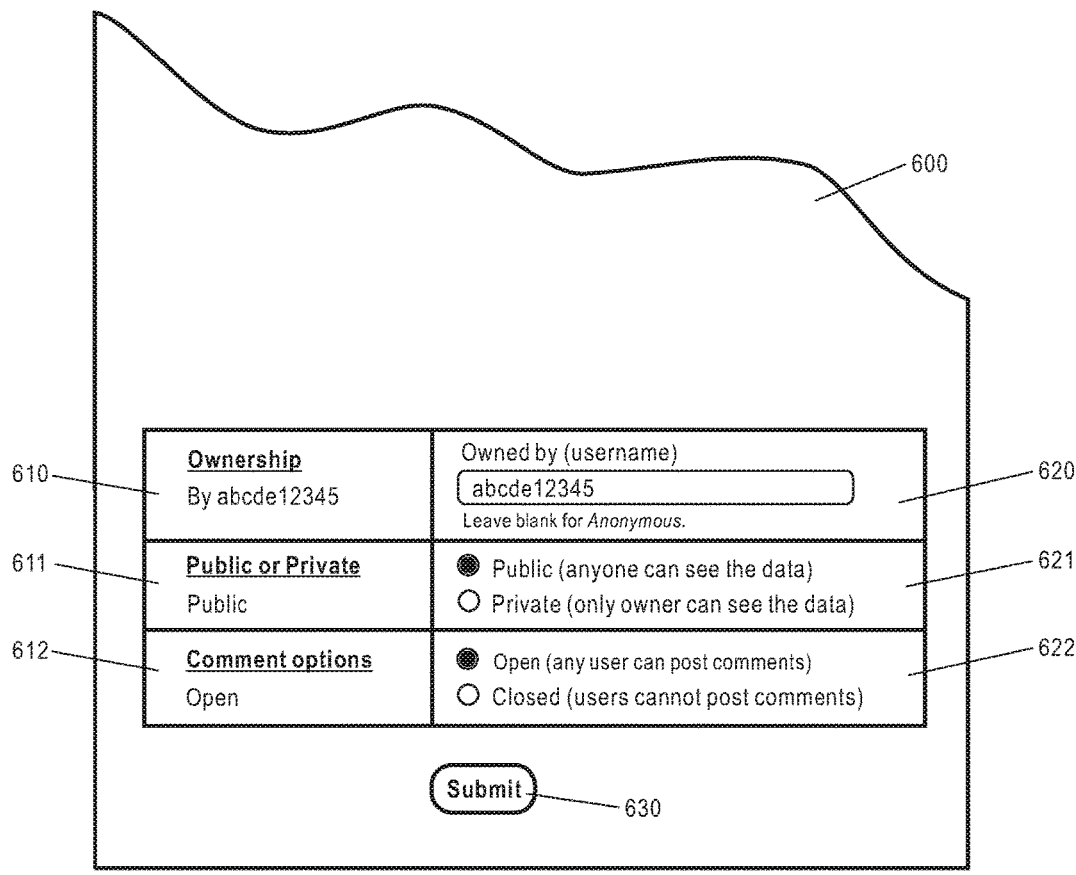
FIG. 6 is a part of web page of an exemplary embodiment containing an ownership data input field.

Referring now to FIG. 6, an exemplary embodiment of an implementation part of thing-webpage 600, in a thing-webpage 600 of predetermined location having an ownership field 610 showing the owner is user abcde123456, and the input field 620 "owned by" also showing user abcde12345. To transfer the thing-webpage, the user can just input the recipient's data (username, email address, etc.), and click submit 630. The things-system will then automatically transfer the webpage 600 to the recipient's owner-account. After transferring the thing-webpage will disappear or be inactive in first owner-account and appear and be active in second owner-account, as the thing-webpage control rights have also transferred. The ownership input field can be left blank for anonymous (e.g., for new thing). When submitting the transferring request, the things-system may manually or automatically provide a verifier (code, message, etc.) to the owner's cellphone (or email, etc.) for owner to confirm the transaction. The recipient may also receive a verifier (code, message, etc.) to accept or open the thing-webpage. The thing-webpage transfer from first owner-account to second owner-account is according to the ownership name in the input field. The thing-webpage 600 may contain a public or private field 611 for owner to choose to have the data either public or private 621. Public will allow anyone to access the thing-webpage 600 to see the data. The thing-webpage 600 owner controls what the public can see such as content, pictures, and videos. The thing-webpage 600 may also contain a comment option field 612 allowing the owner to set it as either open or closed 622. Open means any user can post comments to the thing-webpage 600, which allows any user to interact in the thing-webpage 600

For example, a user uses a processing device (smartphone, etc.) to scan or read a UID from a thing to access (e.g., link) or interact with the thing-webpage.

Thus, while there have been shown and described and pointed out fundamental novel features of the inventive system and method as applied to preferred embodiments thereof, it will be understood that various omissions and substitutions and changes in the form and details of the products and methods illustrated, and in their operation, can be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A system useful in physical objects lifecycle management over a communication network offering commercial opportunities, the system comprising:
    at least one cloud-based physical objects access and management system (objects-system) and at least one processing device for at least one physical object's owner to control and manage their own physical objects from their owner account (owner-account) wherein at least one of: the objects-system, the owner-account or the physical object enabling to automatically match and automatically set up at least one of: physical object, information and/or connection without opening the physical object's packaging box to activate and/or connect; and further comprising:
    scanning or reading a unique identification code (UID) by the processing device from the physical object;
    transmitting at least the UID to the owner-account from the processing device;
    receiving at least the UID directly or redirected from the processing device and/or the physical object by the objects-system;
    retrieving or opening at least one physical object's webpage (object-webpage) by the UID from the owner-account, wherein at least one of the object-webpage further comprises a recipient identity input field for current owner to fill in the recipient identity, to transfer ownership of the object-webpage;
    displaying the recipient identity input field from at least one said object-webpage of predetermined location;
    filling in the recipient identity into the input field to the predetermined location;
    executing by submitting the object-webpage to the objects-system for predetermined purpose;
    transferring the object-webpage and/or the UID including control rights, from the current owner-account to the recipient owner-account according to the recipient identity in the input field, enabling the object-webpage and/or the UID to disappear or be inactive in the current owner-account, and appear and be active in the recipient owner-account.

2. The system of claim 1, wherein the recipient identity is further comprising at least one of: username, email address, number, keyboard characters and non-keyboard characters.

3. The system of claim 1, wherein the transferring is further comprising of auto and/or mass transferring from first owner-account to second owner-account.

4. The system of claim 1, wherein the objects-system is further comprising a verifier for the current owner and/or the recipient to confirm the executing and/or the transferring.

5. The system of claim 1, wherein the objects-system(s), the owner-account(s), the processing device(s) and/or the physical object(s) is/are further comprising of interaction and/or broadcast.

6. The system of claim 1, wherein the objects-system(s) and/or the owner-account(s) is/are further comprising of selectively and/or automatically classifying and/or combining the physical object(s).

7. The system of claim 1, wherein the owner-account is comprising at least one of: authorized party, originator party, product manufacturer, end-user, original equipment manufacturer (OEM), original design manufacturer (ODM), original brand manufacturer (OBM), brand, intermediary, product distributor, consumer, e-commerce store, store selling the product, service provider, owner of the product, intended recipient of ownership rights to the product, law enforcement personnel, and a party finding a product that has been previously lost or stolen.

8. The system of claim 1, wherein the UID is comprising of printed, integrated and/or embedded to location in at least one of: label, tag, card, surface, interior, life body, mainboard, module, processor board, control board, communication board, display board, I/O board, IC board, sensor board, flexible printed circuit board (FPCB), printed circuit board (PCB), RFID, inlay, processor, chip, IC, and sensor.

9. The system of claim 1, wherein processing device is comprising of obtaining the UID located in at least one of: barcode, QR code, pattern, symbol, RFID, ticket, card, screen, billboard, newspaper, magazine, toy, gift, souvenir, jewelry, handbag, shoes, apparel, cosmetic, household article, furniture, work of art, collection, office supply, vehicle, machine, electrical product, wearable product, industrial product, agricultural product, food, pharmaceutical, living things and object.

10. The system of claim 1, wherein the communication network is comprising at least one of: wired, wireless, cellular, microwave, RF, RFID, NFC, WIFI, WiGig, Bluetooth, Thread, ZigBee, RuBee, DASH7, Z-Ware, 6LoWPAN, OSIAN, MyriaNed, Wavenis, magnetic, scan, light, vibration, sonar, infrared and laser.

11. The system of claim 1, wherein the objects-system, the owner-account, the processing device and the UID are comprising using and/or operating for at least one of: product tracking, product traceability, product verification, product identification, product warranty, product loss and found, anti-counterfeit, recycle, drugs management, drugs trace, guns management, guns trace, foods management, product management, product's ownership rights certification, product's ownership right transfer, product remote control, product remote monitor, supply chain management, prevention of theft, online product verification, product selling, e-commerce, man-machine interaction, Internet of Things, managing, controlling and processing of the data from the predetermined location comprising at least one of: information, message, picture, video, game, multimedia, content and command.

12. The system of claim 1, wherein the processing device and/or the physical object is/are comprising at least one of feature and/or function: scan, RFID, NFC, barcode, QR code, symbol, pattern, lens, display, sensor, battery, GPS, solar power, wearable feature, wired/wireless feature, machine vision, machine readable feature, machine perception, mobile feature, phone feature, smart feature, data communication feature, biometric identity verification, artificial intelligence and robot.

13. The system of claim 1, wherein the objects-system, the account and/or the processing device is/are comprising at least one of internet application, internet website and internet platform, enabling selectively or automatically at least one of: install, access, activate, deactivate, manage, control, process, command, program, monitor, read, write, edit, delete, update, interact, UID resolution, play and view the product, further including Internet of Things.

14. The system of claim 1, wherein the UID is comprising at least one of feature: passive/semi-passive/active manner, activated/deactivated feature, conjunction with a verifier, data ID, video ID, picture ID, content ID, node ID, ID card number, passport number, animal ID, biometrics identification, object pattern, physical characteristics, morphological feature, deoxyribonucleic acid (DNA) code, vehicle ID, index, uniform resource identifier (URI), uniform resource locator (URL), internet protocol address (IP address), mobile equipment identifier (MEID), electronic product code (EPC), international article number, European article number (EAN), global location number (GLN), global trade item number (GTIN), integrated circuit card identifier (ICCID), international mobile subscriber identity (IMSI), GPS location, credit card number, email address, identifier, CPU number, IMEI number, phone number, SIM number, MAC address, DNS address, host address, server address, node address, network address.

15. The system of claim 1, wherein the UID is further comprising of providing machine readable or machine perception feature, enabling the processing device and/or the physical object to obtain the UID manually and/or automatically control, communicate and/or exchange data with the owner-account.

16. The system of claim 1, wherein the objects-system and/or owner-account is/are further comprising of providing service to a third party and/or to communicating with third party's network and/or physical object.

17. The system of claim 1, wherein the objects-system and/or the owner-account is/are further comprising at least one of: transferring product-related information, transferring product data file/record, data management, command setup, platform setup, creating application, tracking product, controlling product, operation, monitoring product data, open API/platform, enterprise resource planning (ERP), supply chain management (SCM), customer relationship management (CRM), material requirements planning (MRP), tax administration, human management, animal management, online to offline (O2O), e-commerce, cloud service, interaction, big data, advertising, insurance, financing, mortgage, providing service and selling the product.

18. The system of claim 1, wherein the physical object is further comprising of at least one vending-machine providing and/or transmitting and/or broadcasting the vending-machine's UID; wherein the processing device is comprising at least one smartphone enabling access to at least one vending-machine owner-account and/or platform, to control and/or communicate with the vending-machine by reading or receiving the vending-machine's UID, and transmitting the smartphone's UID and/or acquiring the vending-machine's UID to the vending-machine owner-account and/or platform for predetermined purpose.

19. The system of claim 1, wherein the process device and/or physical object is/are further comprising at least one of: smartphone, wearable, portable device, vehicle, boat, ship, aircraft, home appliance, machine, product, and property.

* * * * *